United States Patent
Rao et al.

(10) Patent No.: US 11,204,873 B2
(45) Date of Patent: Dec. 21, 2021

(54) PRE-DECOMPRESSING A COMPRESSED FORM OF DATA THAT HAS BEEN PRE-FETCHED INTO A CACHE TO FACILITATE SUBSEQUENT RETRIEVAL OF A DECOMPRESSED FORM OF THE DATA FROM THE CACHE

(71) Applicant: EMC IP Holding Company LLC, Hopkinton, MA (US)

(72) Inventors: Attilio Rao, Rome (IT); Max Laier, Seattle, WA (US); Anton Rang, Houlton, WI (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 83 days.

(21) Appl. No.: 16/678,826

(22) Filed: Nov. 8, 2019

(65) Prior Publication Data
US 2021/0141729 A1    May 13, 2021

(51) Int. Cl.
*G06F 12/00*     (2006.01)
*G06F 12/0862*  (2016.01)
*G06F 12/0891*  (2016.01)
*G06F 12/02*     (2006.01)
*G06F 3/06*      (2006.01)

(52) U.S. Cl.
CPC .......... *G06F 12/0862* (2013.01); *G06F 3/064* (2013.01); *G06F 3/0626* (2013.01); *G06F 3/0656* (2013.01); *G06F 3/0679* (2013.01); *G06F 12/0246* (2013.01); *G06F 12/0891* (2013.01)

(58) Field of Classification Search
CPC ............ G06F 12/0862; G06F 12/0246; G06F 3/0626; G06F 3/0679; G06F 3/064; G06F 12/0891; G06F 3/0656
USPC ......................................................... 711/118
See application file for complete search history.

(56) References Cited

U.S. PATENT DOCUMENTS

2001/0038642 A1* 11/2001 Alvarez, II ............. H03M 7/40
                                                                                370/477
2020/0249877 A1*  8/2020 McIlroy ................. G06F 3/0661

* cited by examiner

*Primary Examiner* — Mardochee Chery
(74) *Attorney, Agent, or Firm* — Amin, Turocy & Watson, LLP (57) ABSTRACT

Pre-decompressing a compressed form of data that has been pre-fetched into a cache to facilitate subsequent retrieval of a decompressed form of the data from the cache is presented herein. A system retrieves, from a first portion of a cache, a compression chunk comprising compressed data blocks representing a compressed form of a group of data blocks in response to a first cache hit from the first portion of the cache being incurred, decompresses the compression chunk to obtain a decompressed chunk comprising uncompressed data blocks representing an uncompressed form of the group of data blocks, and inserts the uncompressed data blocks into a second portion of the cache. Further, the system retrieves, from the second portion of the cache, an uncompressed data block of the uncompressed data blocks in response to a second cache hit from the second portion of the cache being incurred.

20 Claims, 10 Drawing Sheets

PRE-DECOMPRESSING A COMPRESSED FORM OF DATA THAT HAS BEEN PRE-FETCHED INTO A CACHE TO FACILITATE SUBSEQUENT RETRIEVAL OF A DECOMPRESSED FORM OF THE DATA FROM THE CACHE

TECHNICAL FIELD

The subject disclosure generally relates to embodiments for pre-decompressing a compressed form of data that has been pre-fetched into a cache to facilitate subsequent retrieval of a decompressed form of the data from the cache.

BACKGROUND

Conventional systems perform inline decompression when reading compressed data. In this regard, such systems perform decompression operations during each read cycle of the compressed data—reducing read throughput and system performance. Consequently, conventional systems have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional storage technologies have had some drawbacks with respect to decompressing compressed data during each read cycle of the compressed data. On the other hand, various embodiments disclosed herein can improve system performance by pre-decompressing compressed data that has been pre-fetched into a memory before an un-compressed form of such data has been requested.

For example, a system, e.g., a distributed file system, an elastic cloud storage (ECS) system, etc. can comprise a processor; and a memory that stores executable components that, when executed by the processor, facilitate performance of operations by the system, the executable components comprising: a decompression component that in response to a first cache hit from a first portion, e.g., encoded space, of a cache of the system being incurred, retrieves, from the first portion of the cache, a compression chunk comprising compressed data blocks representing a compressed form of a group of data blocks, decompresses the compression chunk to obtain a decompressed chunk comprising uncompressed data blocks representing an uncompressed form of the group of data blocks, and inserts the uncompressed data blocks into a second portion, e.g., decoded space, of the cache; and a read component that, in response to a second cache hit from a second portion of the cache being incurred, retrieves an uncompressed data block of the uncompressed data blocks from the second portion of the cache, resulting in the uncompressed data block being accessible to a client application.

In an embodiment, the executable components further comprise a circular buffer; and a pre-fetch thread component that inserts, e.g., locklessly inserts, in the circular buffer via respective pre-fetch threads, processes, etc., a group of objects comprising respective information representing locations, within the first portion of the cache, of respective groups of compressed data blocks of compression chunks comprising the compression chunk.

In another embodiment, the executable components further comprise a counter component comprising respective counters for objects of the group of objects. In this regard, the counter component initializes a count value of a counter of the respective counters for an object of the objects equal to an amount of the compressed data blocks that have been included in the compression chunk, the amount representing a number of compressed data blocks of the compression chunk that are expected to be inserted in the first portion of the cache; and in response to a compressed data block of the compressed data blocks being determined to be inserted in the first portion of the cache, decrements the count value of the counter.

In yet another embodiment, the pre-fetch thread component further: in response to the count value of the counter being determined to be equal to 0, inserts, via a pre-fetch thread of the respective pre-fetch threads, the object in the circular data buffer.

In an embodiment, the decompression component comprises: a pre-decompress thread component that, in response to the object being determined to be inserted in the circular buffer, retrieves, e.g., locklessly retrieves, via a pre-decompress thread of a group of pre-decompress threads, processes, etc. the object from the circular buffer. Further, based on information of the respective information included in the object representing the locations of the compressed data blocks of the compression chunk, the pre-decompress thread component retrieves the compressed data blocks of the compression chunk from the first portion of the cache to incur the first cache hit.

In one embodiment, the second portion of the cache comprises storage buffers that comprise the uncompressed data blocks and that are indexed via respective block numbers. In this regard, the read component further receives, via a processing thread corresponding to the client application, a read request to access, via a shared mode, a buffer of the buffers—the read request comprising a block number of the respective block numbers representing the buffer. In turn, based on the block number, the read component locks the buffer in the shared mode to prevent a modification of the buffer during an access of the buffer, and in response to the buffer being determined to comprise data, retrieves a copy of the data from the buffer to incur the second cache hit—the copy of the data comprising the uncompressed data block.

In an embodiment, a method comprises: in response to a compression chunk being stored in an encoded portion of a cache of a system comprising a processor, retrieving, by the system, the compression chunk from the encoded portion of the cache—the compression chunk comprising compressed data blocks representing a compressed form of data blocks; decompressing, by the system, the compression chunk to obtain a decompressed chunk comprising uncompressed data blocks representing an uncompressed form of the data blocks; storing, by the system, the decompressed chunk in a decoded portion of the cache; and in response to receiving, from a client application, a read request to read a data block of the data blocks, retrieving, by the system, an uncompressed data block of the uncompressed data blocks comprising the data block from the decoded portion of the cache to facilitate access of the data block by the client application.

In one embodiment, the decompressing comprises: decompressing the compressed data blocks to obtain the uncompressed data blocks. In another embodiment, the storing the decompressed chunk comprises: storing the uncompressed data blocks in the decoded portion of the cache.

In yet embodiment, the method further comprises: storing, by the system, the compressed data blocks of the compression chunk in the encoded portion of the cache.

In an embodiment, the method further comprises: initializing, by the system, a count value of a counter of the system equal to an amount of the compressed data blocks of the compression chunk; and in response to a compressed data block of the compressed data blocks being stored in the encoded portion of the cache, decrementing, by the system, the count value.

In one embodiment, the method further comprises: in response to the count value of the counter being determined to be equal to 0, storing, by the system in a circular data buffer of the system, an object representing respective locations, within the encoded portion of the cache, of the compressed data blocks of the compression chunk.

In another embodiment, the method further comprises: in response to the object being determined to be stored in the circular data buffer, retrieving, by the system, the object from the circular buffer; and based on the object, retrieving, by the system, the compressed data blocks of the compression chunk from the respective locations within the encoded portion of the cache.

In yet another embodiment, the decoded portion of the cache comprises storage buffers that are indexed via respective block numbers, the storage buffers correspond to the uncompressed data blocks, the read request comprises a block number of the respective block numbers representing a storage buffer of the storage buffers, and the retrieving the uncompressed data block comprises: based on the block number, locking the storage buffer to prevent a modification of the storage buffer during an access of the storage buffer; and in response to the storage buffer being determined to comprise data, retrieving a copy of the storage buffer comprising the uncompressed data block.

Another embodiment can comprise a machine-readable storage medium comprising instructions that, in response to execution, cause a system comprising a processor to perform operations, comprising: in response to determining that a compression chunk comprising a compressed form of storage blocks has been stored in a first part of a cache of the system, retrieving the compression chunk from the first portion of the cache; decompressing the compression chunk to obtain a decompressed chunk comprising an uncompressed form of the storage blocks; inserting the decompressed chunk in a second part of the cache; and in response to receiving, from a client application, a request to read a storage block of the storage blocks, retrieving an uncompressed form of the storage block from the decompressed chunk that has been inserted in the second part of the cache to facilitate an access, by the application, of the storage block In yet another embodiment, the operations further comprise: setting a count value of a counter equal to an amount of compressed storage blocks comprising the compressed form of the storage blocks that have been included in the compression chunk; and in response determining that a compressed storage block of the compressed storage blocks has been stored in the first part of the cache, decrementing the count value.

In an embodiment, the operations further comprise: in response to the count value being determined to be equal to 0, inserting an object representing respective locations of the compressed storage blocks within the first part of the cache, wherein the retrieving the compression chunk comprises in response to the inserting the object, retrieving the compressed storage blocks from the respective locations within the first part of the cache.

As described above, conventional storage technologies have had some drawbacks with respect to decompressing compressed data during each read cycle of the compressed data. In contrast, and now referring to FIG. 1, various embodiments described herein can improve system performance by pre-decompressing compressed data that has been pre-fetched into a memory before an un-compressed form of such data has been requested. In this regard, a system (100), e.g., a distributed file system, an ECS system, etc. can comprise a parallel distributed networked file system, e.g., OneFS™ file system provided by Dell EMC® Isilon Systems, e.g., utilizing a FreeBSD based operating system. In embodiment(s), the distributed file system can comprise a host server, a client server, etc. In other embodiment(s), various components of the distributed file system can be included in a host application, a client application, storage/data services, etc.

Figure 9:
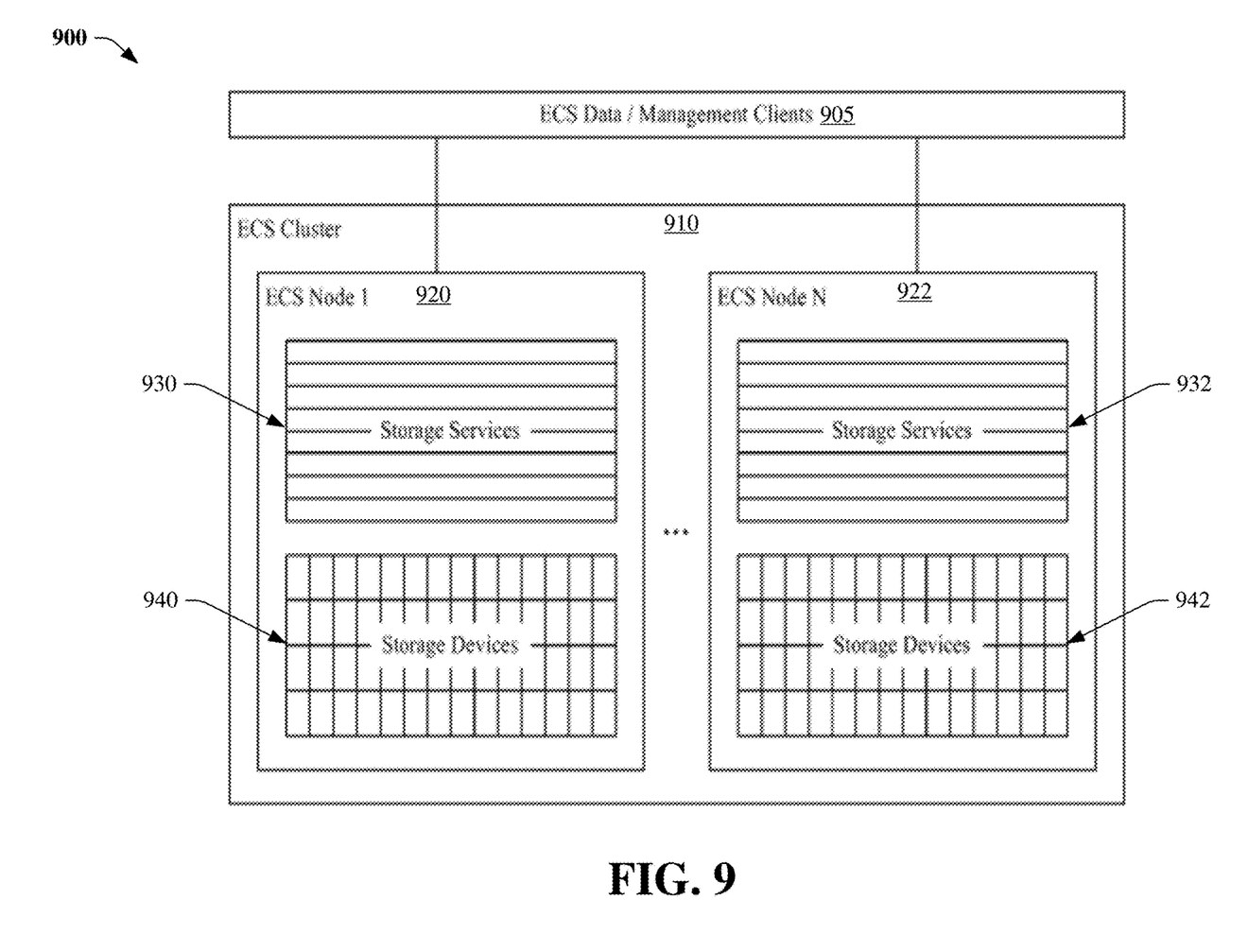
FIG. 9 illustrates a block diagram of an elastic cloud storage (ECS) system, in accordance with various example embodiments.

Referring now to FIG. 9, a Dell EMC® Isilon file storage system (900) can comprise a cloud-based object storage appliance (e.g., comprising storage control software, components (e.g., 120, 140, etc.); ECS data clients/management clients (905); storage services (930, 932) and storage devices (940, 942) (e.g., comprising storage media, physical magnetic disk media, solid-state drive (SSD) media, e.g., flash storage, etc.) of a storage cluster (910). In this regard, the cloud-based object storage appliance is a type of clustered file system that spreads data across multiple storage nodes, e.g., usually for redundancy or performance. Further, such clustered file system can simultaneously be mounted on multiple file servers (not shown), e.g., OneFS™ clusters, and can provide features like location-independent addressing and redundancy which can improve reliability and/or reduce the complexity of portion(s) of a data cluster, data storage cluster, etc.

As illustrated by FIG. 9, the storage service(s) and storage device(s) can be included in respective data storage nodes (920, 922) of data storage clusters, e.g., combined as an integrated system—with no access to the storage devices other than through the Dell EMC® Isilon file storage system. In this regard, the respective data storage nodes can be communicatively and/or operatively coupled to each other, with the storage service(s) comprising respective processes, processing jobs, job worker processes, applications, etc. that can be utilized to service user requests according to user-based storage policies.

In general, the respective data storage nodes can communicate with user devices via wired and/or wireless communication network(s) to provide access to services that are based in the cloud and not stored locally (e.g., on a user device). A typical cloud-computing environment can include multiple layers, aggregated together, which interact with each other to provide resources for end-users.

The Dell EMC® Isilon file storage system can support storage, manipulation, and/or analysis of unstructured data on a massive scale on commodity hardware. As an example, the Dell EMC® Isilon file storage system can support mobile, cloud, big data, and/or social networking applications. In another example, the Dell EMC® Isilon file storage system can be deployed as a turnkey storage appliance, or as a software product that can be installed on a set of qualified commodity servers and disks, e.g., within a node, data storage node, ECS node, etc. of a cluster, data storage cluster, ECS cluster, etc. In this regard, the Dell EMC® Isilon file storage system can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the Dell EMC® Isilon file storage system can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed and/or closed—becoming immutable, e.g., read-only and delete only.

Referring again to FIG. 1, the system comprises a decompression component (120) that, in response to a first cache hit from a first portion of a cache (102) of the system being incurred, retrieves, from the first portion of the cache (104), a compression chunk (110) comprising compressed data blocks representing a compressed form of a group of data blocks. In this regard, the decompression component further decompresses the compression chunk to obtain a decompressed chunk (130) comprising uncompressed data blocks representing an uncompressed form of the group of data blocks, and inserts, stores, etc. the uncompressed data blocks into a second portion (106) of the cache.

Figure 1:
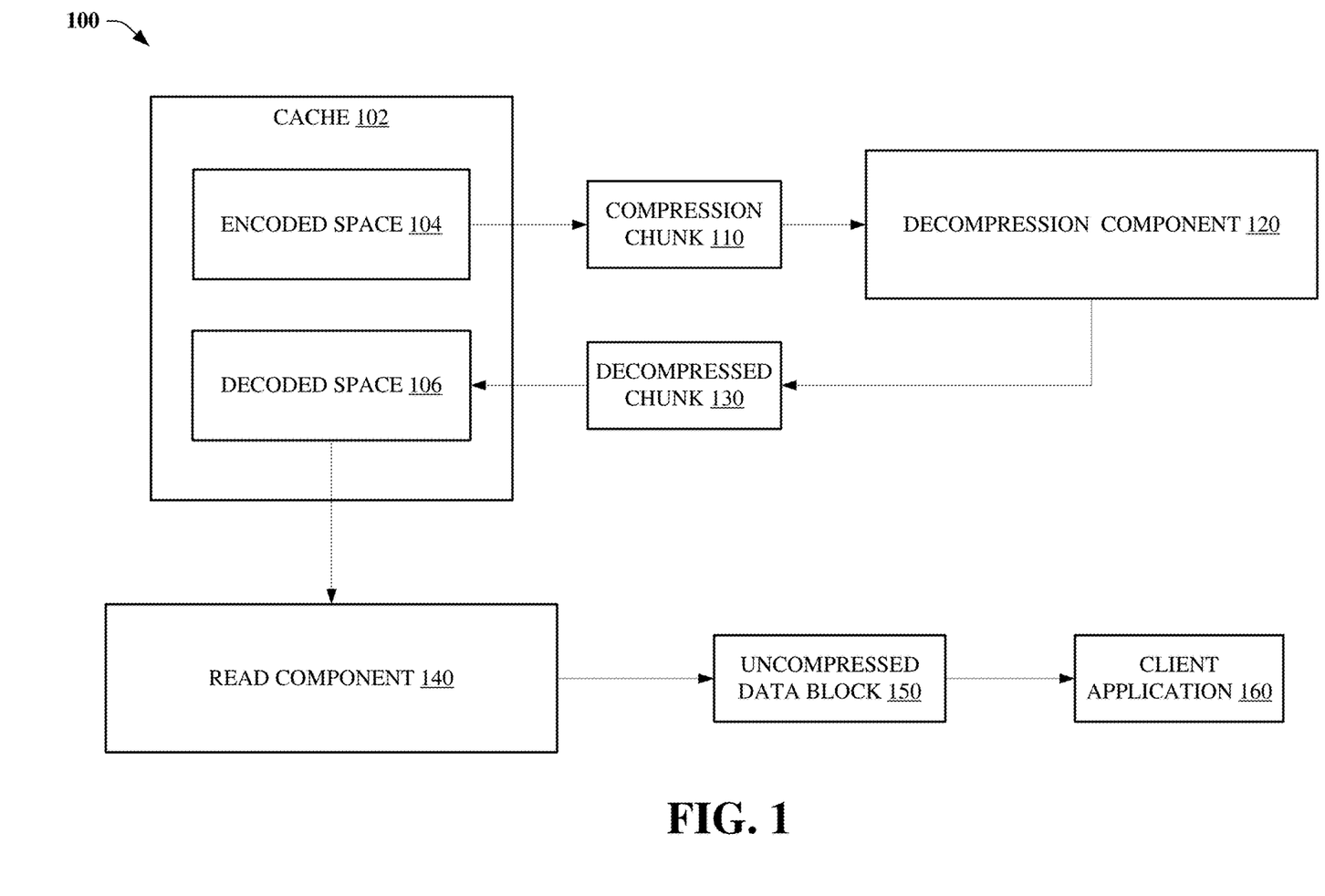
FIG. 1 illustrates a block diagram of a system that facilitates improving system performance by pre-decompressing compressed data that has been pre-fetched into a memory before an un-compressed form of such data has been requested, in accordance with various example embodiments.

In turn, a read component (140), in response to a second cache hit from the second portion of the cache being incurred, retrieves an uncompressed data block (150) of the uncompressed data blocks from the second portion of the cache, resulting in the uncompressed data block being accessible to a client application (160)—improving system performance by pre-decompressing a compression chunk comprising a compressed form of the data that has been pre-fetched into the cache—before at least a portion of the data has been requested, e.g., by a client application (160).

Figure 2:
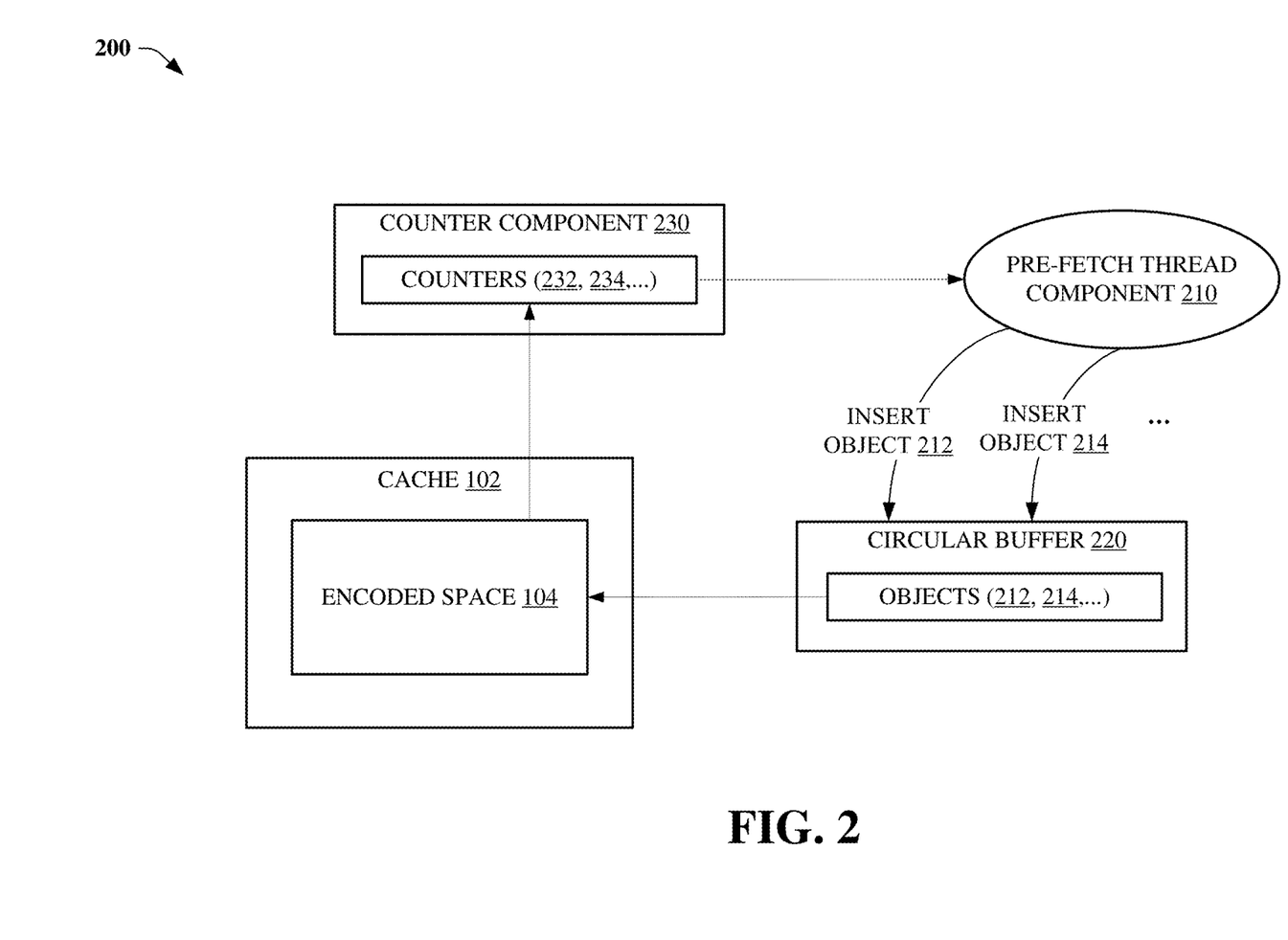
FIG. 2 illustrates a block diagram of a pre-fetch thread component inserting, in a circular buffer, objects representing respective locations of compression chunks within an encoded space of a cache, in accordance with various example embodiments.
Figure 3:
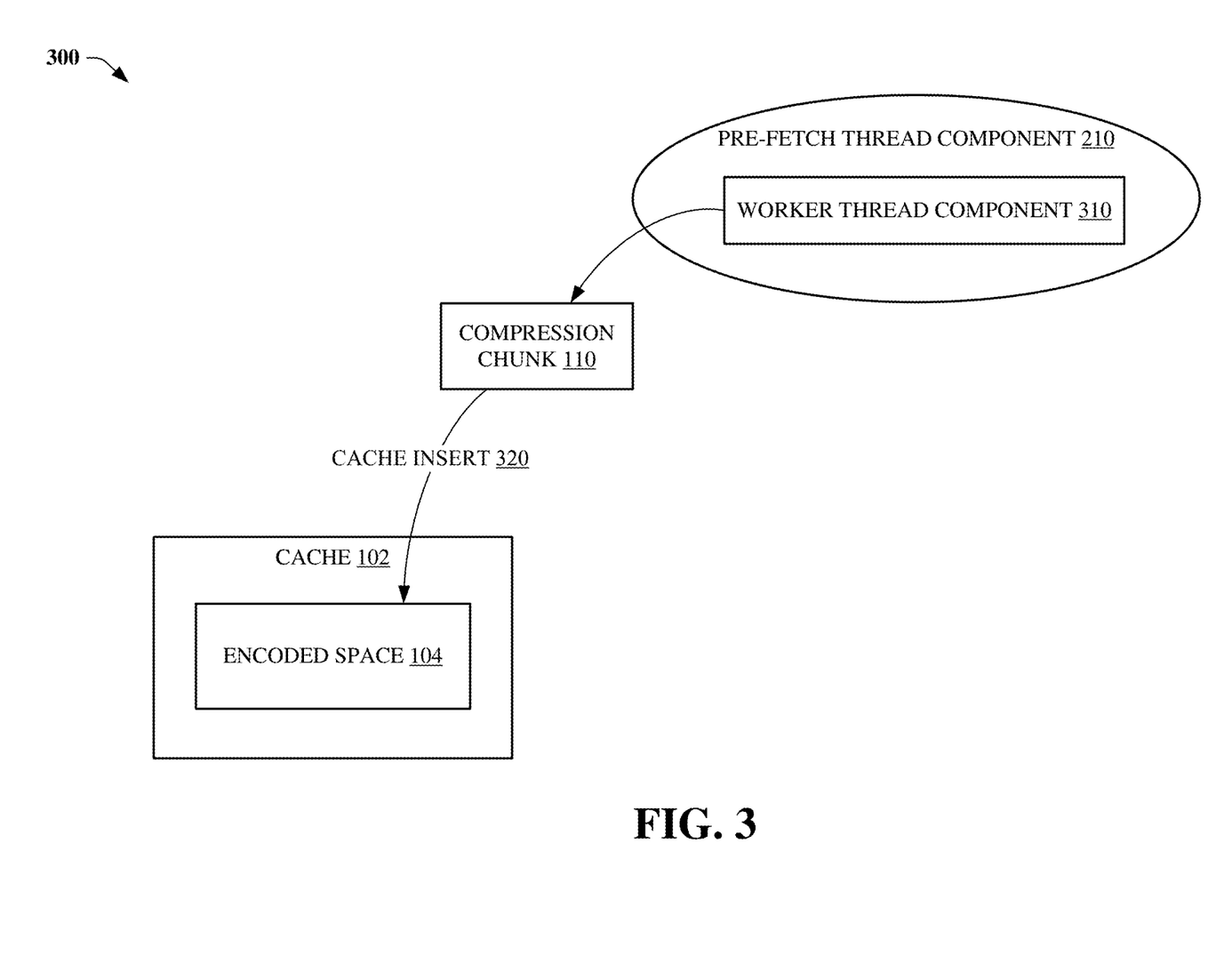
FIG. 3 illustrates a block diagram of a pre-fetch thread component performing a cache insert of a compression chunk in an encoded space of a cache, in accordance with various example embodiments.

In this regard, and now referring to FIGS. 2 and 3, the system can comprise a pre-fetch thread component (210) comprising a worker thread component (310) that inserts, e.g., pre-fetches (e.g., via respective processing, worker, etc. threads, respective pre-fetch threads, etc.), compressed data blocks of the compression chunk into the first portion of the cache.

In turn, a counter component (230) comprises respective counters (232, 234, etc.) corresponding to each compression chunk that is inserted into the cache. The counter component initializes a count value of a counter of the respective counters equal to an amount of the compressed data blocks that have been included in the compression chunk—the amount representing a number of compressed data blocks of the compression chunk that are expected to be inserted in the first portion of the cache.

Further, the pre-fetch thread component generates respective objects (212, 214, etc.) for each compression chunk—the respective objects comprising respective information representing locations, within the first portion of the cache, of respective groups of compressed data blocks of compression chunks comprising the compression chunk.

In this regard, in response to a compressed data block of the compressed data blocks being determined to be inserted in the first portion of the cache, the counter component decrements the count value of the counter. In turn, in response to the count value of the counter being determined, e.g., by the pre-fetch thread component, to be equal to 0, the pre-fetch thread component inserts, locklessly inserts, etc., via a pre-fetch thread of the respective pre-fetch threads, the object in a circular buffer, circular data buffer, circular queue, ring buffer, etc.

In embodiment(s), the pre-fetch thread component, generates, via the cache, a cache insert (320) signal, output, etc. in response to the count value being determined to be equal to 0—representing that all of the compressed data blocks of the compression chunk have been inserted into the cache.

Figure 4:
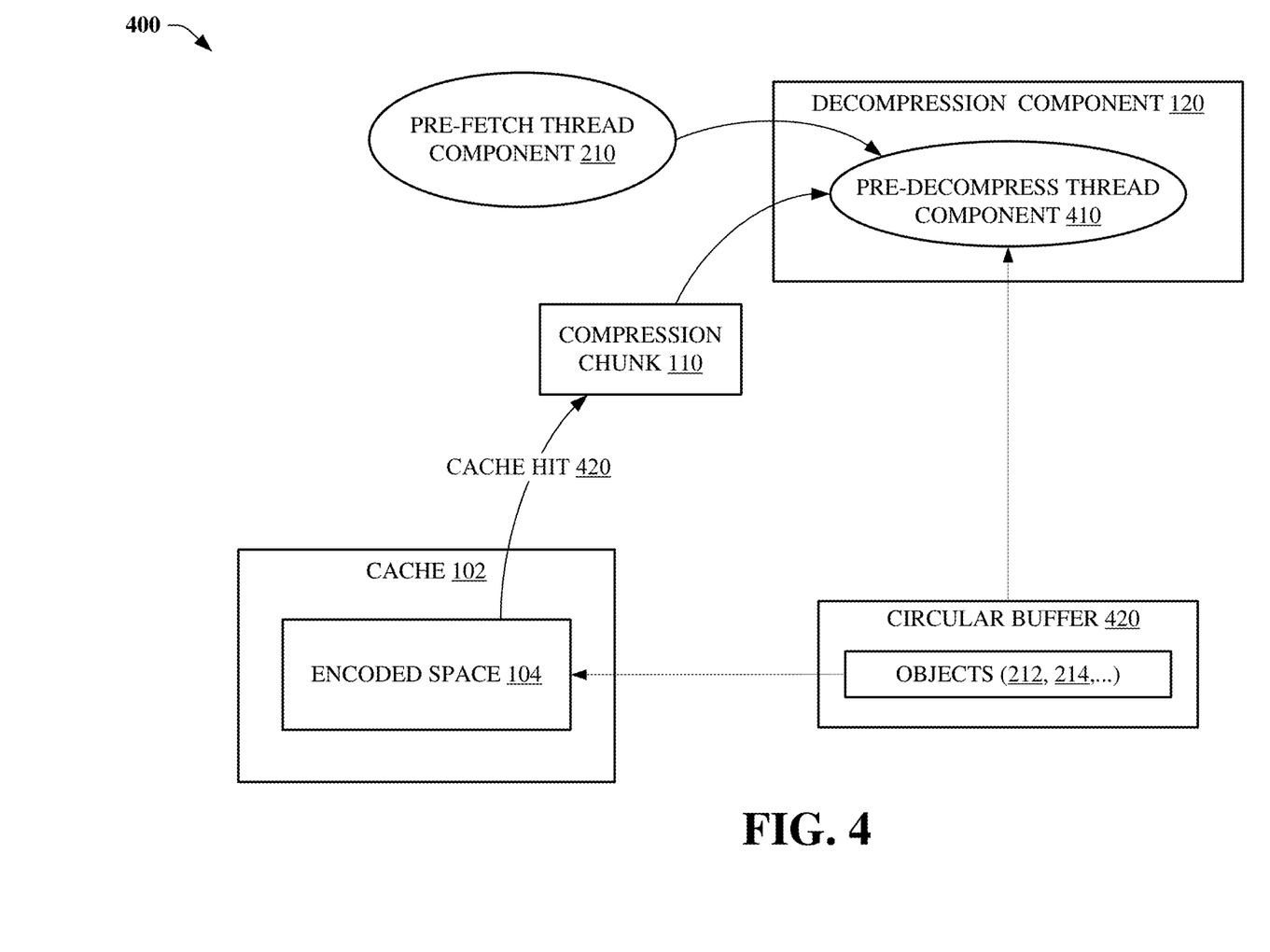
FIG. 4 illustrates a block diagram of a decompression component incurring a cache hit with respect to retrieving a compression chunk from an encoded space of a cache, in accordance with various example embodiments.

Now referring to FIG. 4, a block diagram (400) of the decompression component incurring a cache hit with respect to retrieving the compression chunk from the first portion, encoded space, etc. of the cache is illustrated, in accordance with various example embodiments. In this regard, the decompression component comprises a pre-decompress thread component (410) that, in response to the object being determined to be inserted in the circular buffer, retrieves, locklessly retrieves, etc., via a pre-decompress thread of a group of pre-decompress threads, the object from the circular buffer.

In turn, based on information of the respective information included in the object representing the locations of the compressed data blocks of the compression chunk within the first portion, encoded space, etc. of the cache, retrieves the compressed data blocks of the compression chunk from the first portion of the cache to incur, e.g., resulting in, the first cache hit.

Referring again to FIG. 1, with respect to facilitating access of the uncompressed data blocks that have been inserted, by the decompression component, into the second portion, decoded space, etc. of the cache, the second portion, decoded space, etc. of the cache comprises storage buffers (not shown) that are indexed via respective block numbers, the storage buffers corresponding to the uncompressed data blocks.

In this regard, the read component can receive, via a processing thread corresponding to the client application, a read request to access, via a shared mode, a buffer of the buffers corresponding to an uncompressed data block of the uncompressed data blocks—the read request comprising a block number of the respective block numbers representing the buffer.

Further, based on the block number, the read component locks the buffer in the shared mode to prevent a modification of the buffer during an access, e.g., read, of the buffer, and in response to determining that the buffer comprises data, the read component retrieves, from the buffer, a copy of the data to incur the second cache hit—the copy of the data comprising the uncompressed data block.

FIGS. 5-8 illustrate methodologies for performing operations that facilitate improving system performance by pre-decompressing compressed data that has been pre-fetched into a memory before an un-compressed form of such data has been requested, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
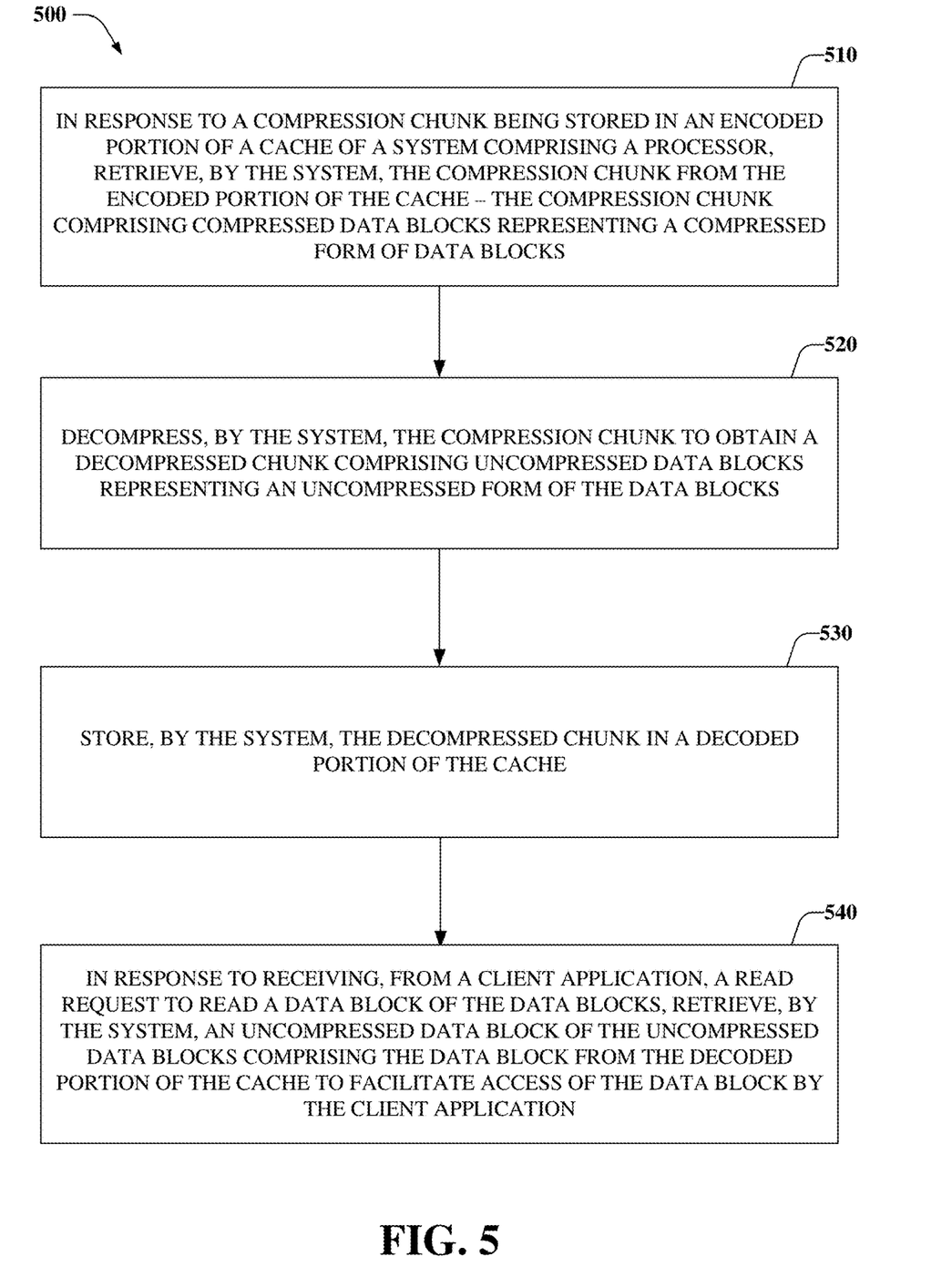
FIG. 5 illustrates a flow chart of a method that facilitates improving system performance by pre-decompressing compressed data that has been pre-fetched into a memory before an un-compressed form of such data has been requested, in accordance with various example embodiments.

Referring now to FIG. 5, a flow chart of a method that facilitates improving system performance by pre-decompressing compressed data that has been pre-fetched into a memory before an un-compressed form of such data has been requested is illustrated, in accordance with various example embodiments.

At 510, in response to a compression chunk being stored in an encoded portion of a cache of a system (e.g., 100) comprising a processor, the system can retrieve the compression chunk from the encoded portion of the cache—the compression chunk comprising compressed data blocks representing a compressed form of data blocks.

At 520, the system can decompress the compression chunk to obtain a decompressed chunk comprising uncompressed data blocks representing an uncompressed form of the data blocks.

At 530, the system can store the decompressed chunk in a decoded portion of the cache. At 540, in response to receiving, from a client application, a read request to read a data block of the data blocks, the system can retrieve an uncompressed data block of the uncompressed data blocks comprising the data block from the decoded portion of the cache to facilitate access of the data block by the client application.

Figure 6:
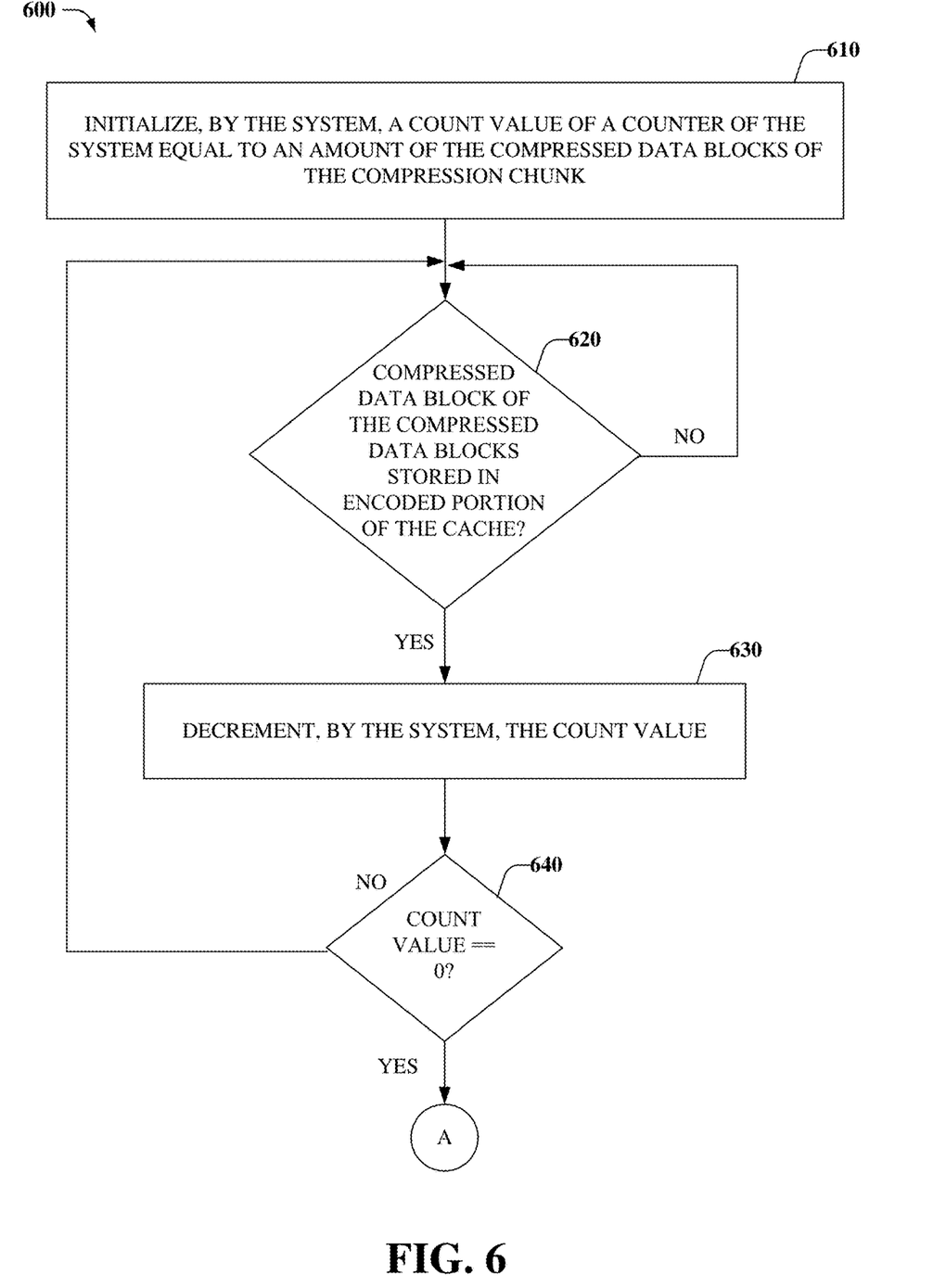
FIGS. 6-7 illustrate flow charts of a method associated with a counter component corresponding to compressed data blocks being stored in an encoded portion of a cache, in accordance with various example embodiments.
Figure 7:
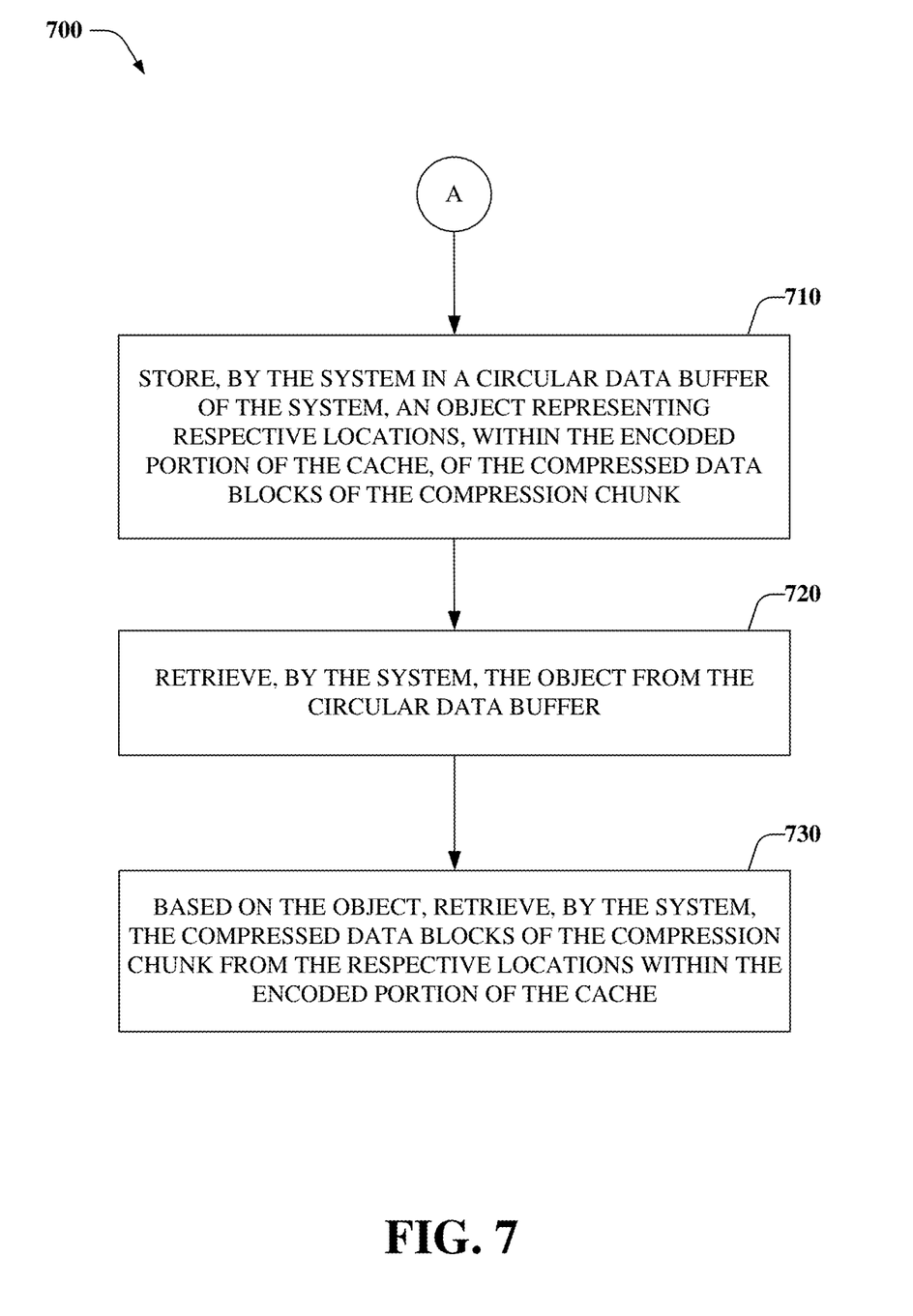

FIGS. 6-7 illustrate flow charts of a method associated with a counter component (230) corresponding to compressed data blocks being stored in an encoded portion of a cache, in accordance with various example embodiments.

At 610, a system (e.g., 100) can initialize a count value of a counter of the system equal to an amount of compressed data blocks that have been included in a compression chunk. In turn, at 620, the system can determine whether a compressed data block of the compressed data blocks has been stored in the encoded portion of the cache.

In this regard, in response to a determination that the compressed data block has been stored in the encoded portion of the cache, the system can decrement the count value at 630; otherwise flow returns to 620.

At 640, the system can determine whether the count value equals 0. In this regard, in response to a determination that the count value equals 0, flow continues to 710, at which the system can store, in a circular data buffer of the system, an object representing respective locations, within the encoded portion of the cache, of the compressed data blocks of the compression chunk; otherwise flow returns to 620.

Flow continues from 710 to 720, at which the system can retrieve the object from the circular data buffer. At 730, based on the object, the system can retrieve the compressed data blocks of the compression chunk from the respective locations within the encoded portion of the cache.

Figure 8:
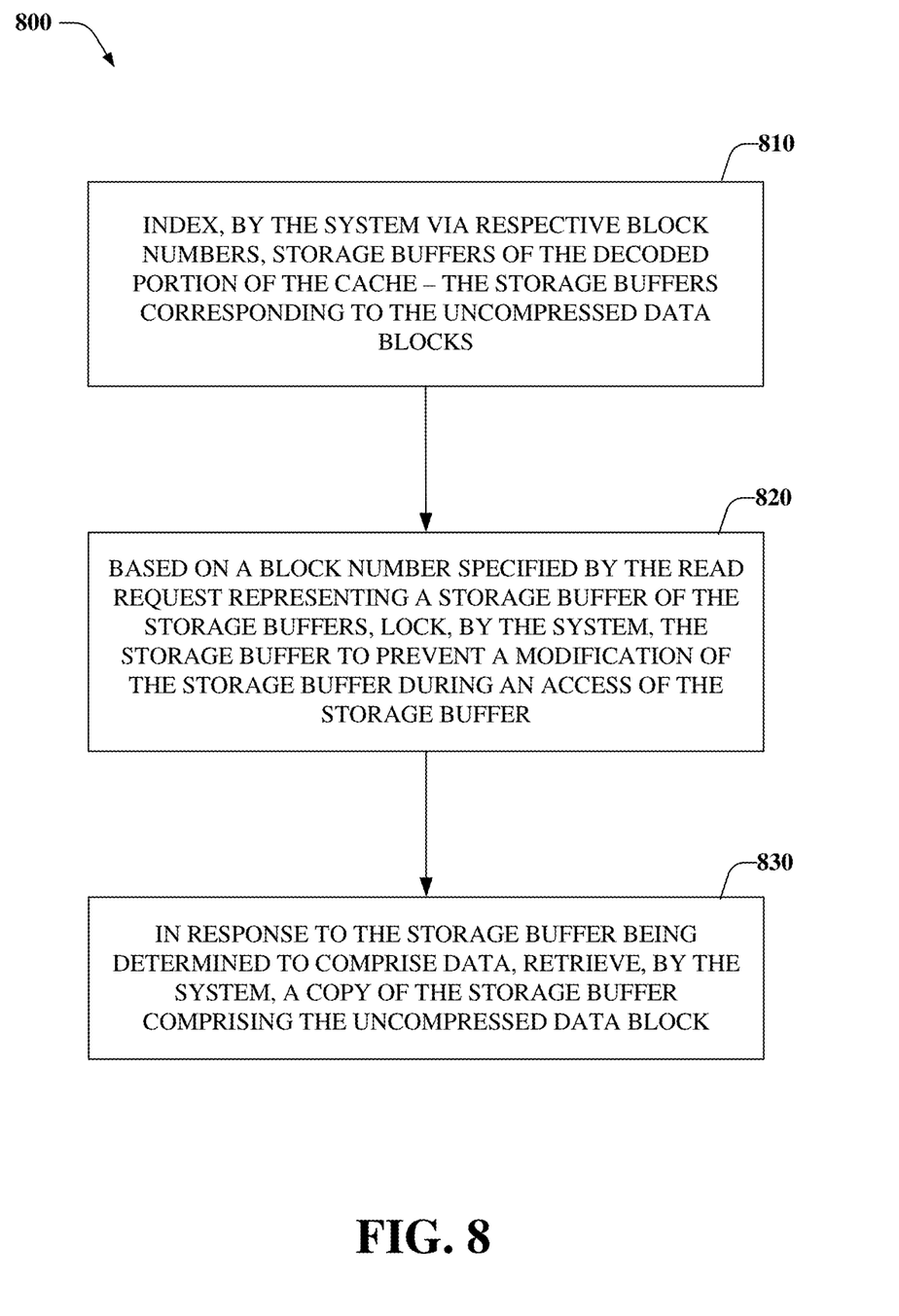
FIG. 8 illustrates a flow chart of a method associated with retrieving an uncompressed data block from a decoded portion of a cache, in accordance with various example embodiments.

Now referring to FIG. 8, a flow chart of a method associated with retrieving an uncompressed data block from a decoded portion of a cache is illustrated, in accordance with various example embodiments. At 810, the system can index, via respective block numbers, storage buffers of the decoded portion of the cache—the storage buffers corresponding to uncompressed data blocks of a decompressed chunk.

At 820 based on a block number that is specified by a read request, e.g., received from a client application, and that represents a storage buffer of the storage buffers, the system can lock the storage buffer to prevent a modification of the storage buffer during an access of the storage buffer.

At 830, in response to the storage buffer being determined to comprise data, the system can retrieve a copy of the storage buffer comprising the uncompressed data block.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic", "logical", "logically", and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component", "system", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "data store", "data storage", "storage device", "storage medium", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in non-volatile memory 1022 (see below), disk storage 1024 (see below), and/or memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory (e.g., 102, 402, 1020) can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
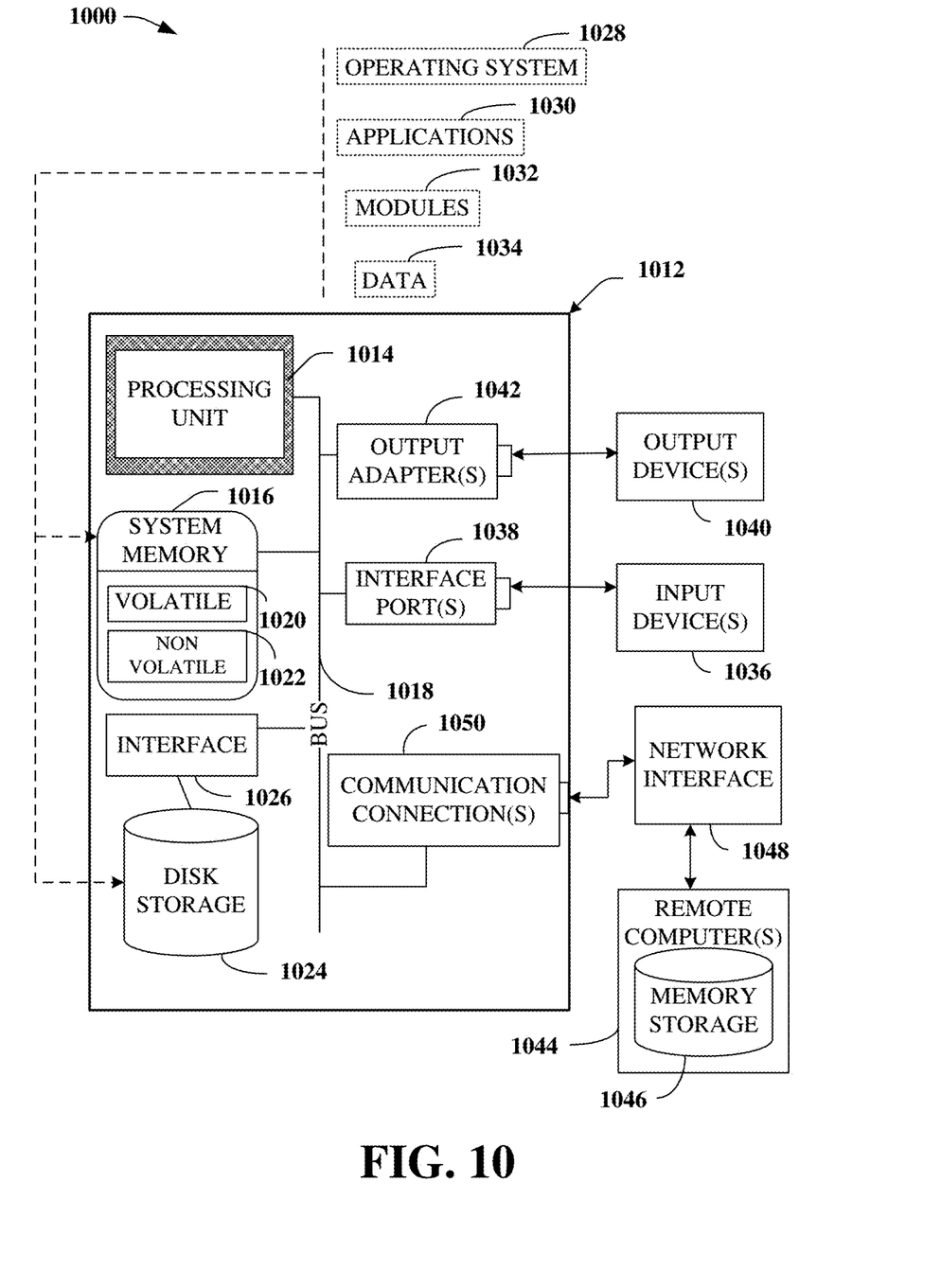
FIG. 10 illustrates a block diagram representing an illustrative non-limiting computing system or operating environment in which one or more aspects of various embodiments described herein can be implemented.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 10, a block diagram of a computing system 1000, e.g., 100, operable to execute the disclosed systems and methods is illustrated, in accordance with an embodiment. Computer 1012 comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 comprises volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can comprise ROM, PROM, EPROM, EEPROM, or flash memory. Volatile memory 1020 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also comprises removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 comprise, for example, a serial port, a parallel port, a game port, a universal serial bus (USB), a wireless based port, e.g., Wi-Fi, Bluetooth, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 comprise, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable components that, when executed by the processor, facilitate performance of operations by the system, the executable components comprising:
   a decompression component that
   in response to a first cache hit from a first portion of a cache of the system being incurred, retrieves, from the first portion of the cache, a compression chunk comprising compressed data blocks representing a compressed form of a group of data blocks,
   decompresses the compression chunk to obtain a decompressed chunk comprising uncompressed data blocks representing an uncompressed form of the group of data blocks, and inserts the uncompressed data blocks into a second portion of the cache; and a read component that, in response to a second cache hit from the second portion of the cache being incurred, retrieves an uncompressed data block of the uncompressed data blocks from the second portion of the cache, resulting in the uncompressed data block being accessible to a client application.

2. The system of claim 1, the executable components further comprising:

a circular buffer; and a pre-fetch thread component that inserts, in the circular buffer via respective pre-fetch threads, a group of objects comprising respective information representing locations, within the first portion of the cache, of respective groups of compressed data blocks of compression chunks comprising the compression chunk.

3. The system of claim 2, wherein the pre-fetch thread component locklessly inserts the group of objects in the circular buffer.

4. The system of claim 3, the executable components further comprising:

a counter component comprising respective counters corresponding to objects of the group of objects, wherein the counter component initializes a count value of a counter of the respective counters for an object of the objects equal to an amount of the compressed data blocks that have been included in the compression chunk, the amount representing a number of compressed data blocks of the compression chunk that are expected to be inserted in the first portion of the cache; and in response to a compressed data block of the compressed data blocks being determined to be inserted in the first portion of the cache, decrements the count value of the counter.

5. The system of claim 4, wherein the pre-fetch thread component further:

in response to the count value of the counter being determined to be equal to 0, inserts, via a pre-fetch thread of the respective pre-fetch threads, the object in the circular data buffer.

6. The system of claim 5, wherein the decompression component comprises:

a pre-decompress thread component that in response to the object being determined to be inserted in the circular buffer, retrieves, via a pre-decompress thread of a group of pre-decompress threads, the object from the circular buffer, and based on information of the respective information included in the object representing the locations of the compressed data blocks of the compression chunk, retrieves the compressed data blocks of the compression chunk from the first portion of the cache to incur the first cache hit.

7. The system of claim 6, wherein the pre-decompress thread component locklessly retrieves the object from the circular buffer.

8. The system of claim 2, wherein the pre-fetch thread component comprises:

a worker thread component that inserts the compression chunk in the first portion of the cache.

9. The system of claim 1, wherein the second portion of the cache comprises storage buffers that are indexed via respective block numbers, wherein the storage buffers correspond to the uncompressed data blocks, and wherein the read component further:

receives, via a processing thread corresponding to the client application, a read request to access, via a shared mode, a buffer of the buffers corresponding to an uncompressed data block of the uncompressed data blocks, wherein the read request comprises a block number of the respective block numbers representing the buffer; and based on the block number, locks the buffer in the shared mode to prevent a modification of the buffer during an access of the buffer, and in response to the buffer being determined to comprise data, retrieves a copy of the data from the buffer to incur the second cache hit, the copy of the data comprising the uncompressed data block.

10. A method, comprising:

in response to a compression chunk being stored in an encoded portion of a cache of a system comprising a processor, retrieving, by the system, the compression chunk from the encoded portion of the cache, wherein the compression chunk comprises compressed data blocks representing a compressed form of data blocks;

decompressing, by the system, the compression chunk to obtain a decompressed chunk comprising uncompressed data blocks representing an uncompressed form of the data blocks;

storing, by the system, the decompressed chunk in a decoded portion of the cache; and in response to receiving, from a client application, a read request to read a data block of the data blocks, retrieving, by the system, an uncompressed data block of the uncompressed data blocks comprising the data block from the decoded portion of the cache to facilitate access of the data block by the client application.

11. The method of claim 10, further comprising:

storing, by the system, the compressed data blocks of the compression chunk in the encoded portion of the cache.

12. The method of claim 11, further comprising:

initializing, by the system, a count value of a counter of the system equal to an amount of the compressed data blocks of the compression chunk; and in response to a compressed data block of the compressed data blocks being stored in the encoded portion of the cache, decrementing, by the system, the count value.

13. The method of claim 12, further comprising:

in response to the count value of the counter being determined to be equal to 0, storing, by the system in a circular data buffer of the system, an object representing respective locations, within the encoded portion of the cache, of the compressed data blocks of the compression chunk.

14. The method of claim 13, further comprising:

in response to the object being determined to be stored in the circular data buffer, retrieving, by the system, the object from the circular buffer; and based on the object, retrieving, by the system, the compressed data blocks of the compression chunk from the respective locations within the encoded portion of the cache.

15. The method of claim 10, wherein the decompressing comprises:

decompressing the compressed data blocks to obtain the uncompressed data blocks.

16. The method of claim 15, wherein the storing the decompressed chunk comprises:
   storing the uncompressed data blocks in the decoded portion of the cache.

17. The method of claim 10, wherein the decoded portion of the cache comprises storage buffers that are indexed via respective block numbers, wherein the storage buffers correspond to the uncompressed data blocks, wherein the read request comprises a block number of the respective block numbers representing a storage buffer of the storage buffers, and wherein the retrieving the uncompressed data block comprises:
   based on the block number, locking the storage buffer to prevent a modification of the storage buffer during an access of the storage buffer; and
   in response to the storage buffer being determined to comprise data, retrieving a copy of the storage buffer comprising the uncompressed data block.

18. A machine-readable storage medium comprising instructions that, in response to execution, cause a system comprising a processor to perform operations, comprising:
   in response to determining that a compression chunk comprising a compressed form of storage blocks has been stored in a first part of a cache of the system, retrieving the compression chunk from the first portion of the cache;
   decompressing the compression chunk to obtain a decompressed chunk comprising an uncompressed form of the storage blocks;
   inserting the decompressed chunk in a second part of the cache; and
   in response to receiving, from a client application, a request to read a storage block of the storage blocks, retrieving an uncompressed form of the storage block from the decompressed chunk that has been inserted in the second part of the cache to facilitate an access, by the application, of the storage block.

19. The machine-readable storage medium of claim 18, wherein the operations further comprise:
   setting a count value of a counter equal to an amount of compressed storage blocks comprising the compressed form of the storage blocks that have been included in the compression chunk; and
   in response determining that a compressed storage block of the compressed storage blocks has been stored in the first part of the cache, decrementing the count value.

20. The machine-readable storage medium of claim 18, wherein the operations further comprise:
   in response to the count value being determined to be equal to 0, inserting an object representing respective locations of the compressed storage blocks within the first part of the cache, wherein the retrieving the compression chunk comprises
      in response to the inserting the object, retrieving the compressed storage blocks from the respective locations within the first part of the cache.

* * * * *